July 5, 1932. G. P. BERRY 1,865,816
FRICTION SERVO BRAKE
Filed Aug. 21, 1930  3 Sheets-Sheet 1
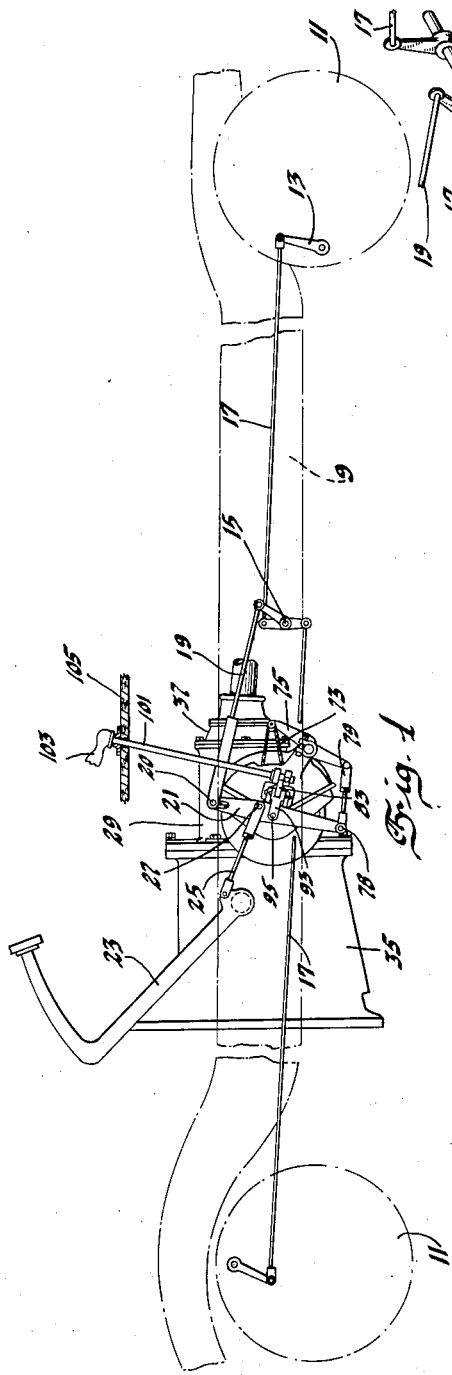
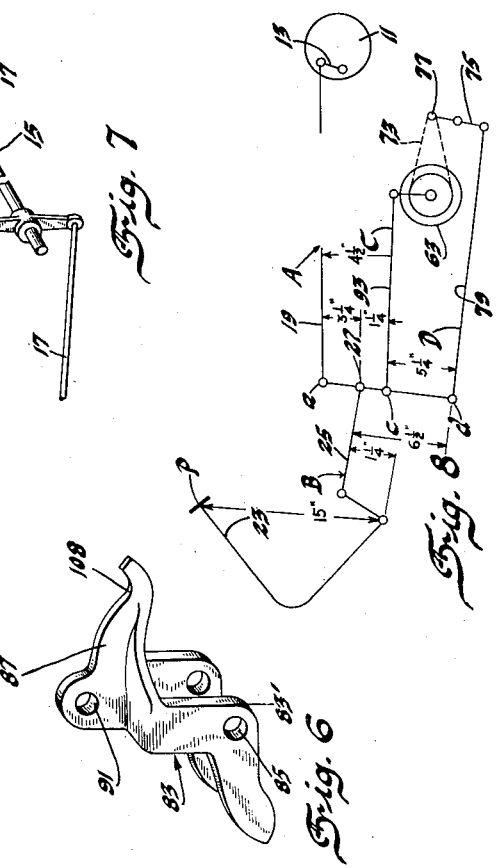
Inventor
George P. Berry
By Blackmore, Spencer & Hush
Attorney

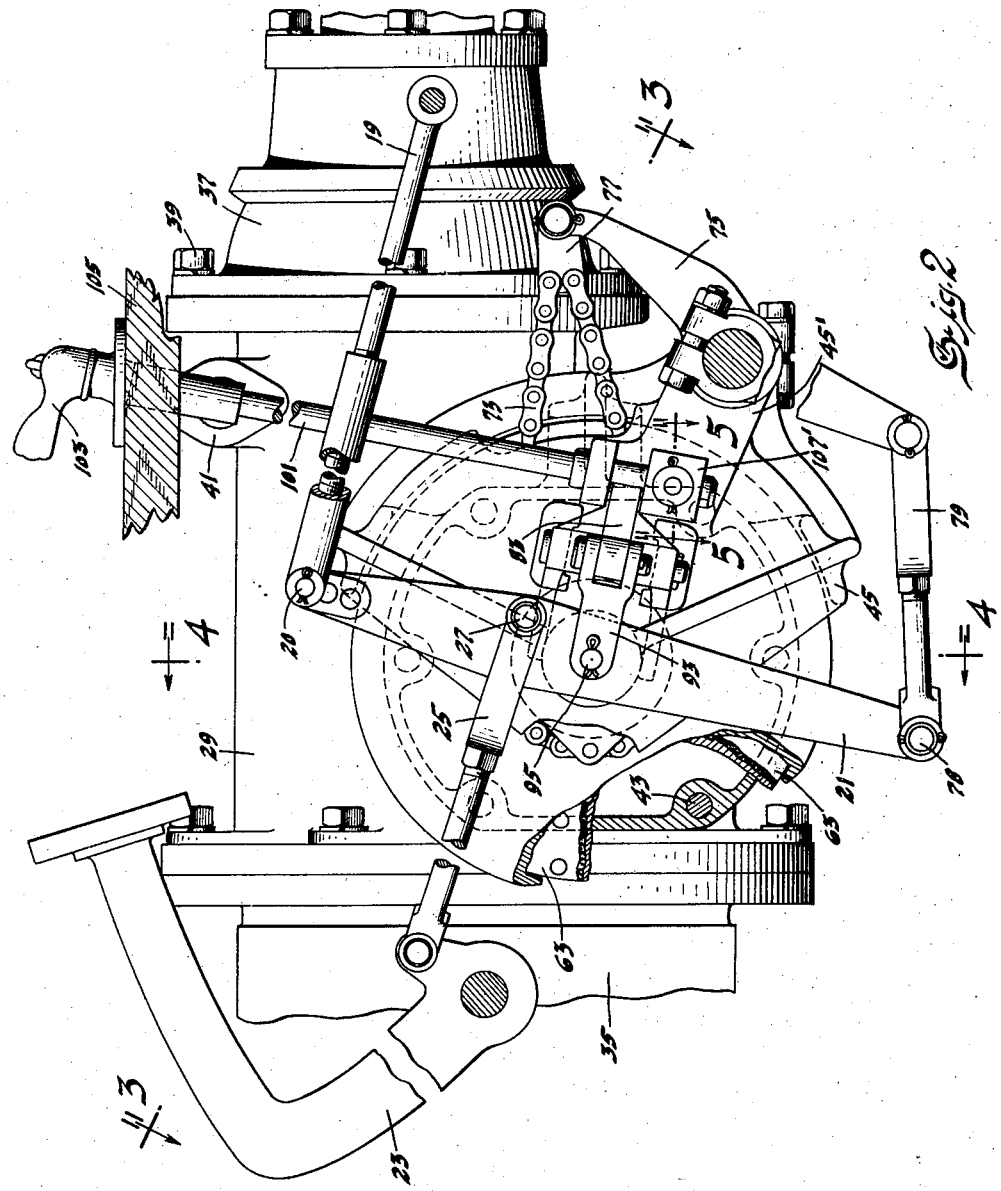

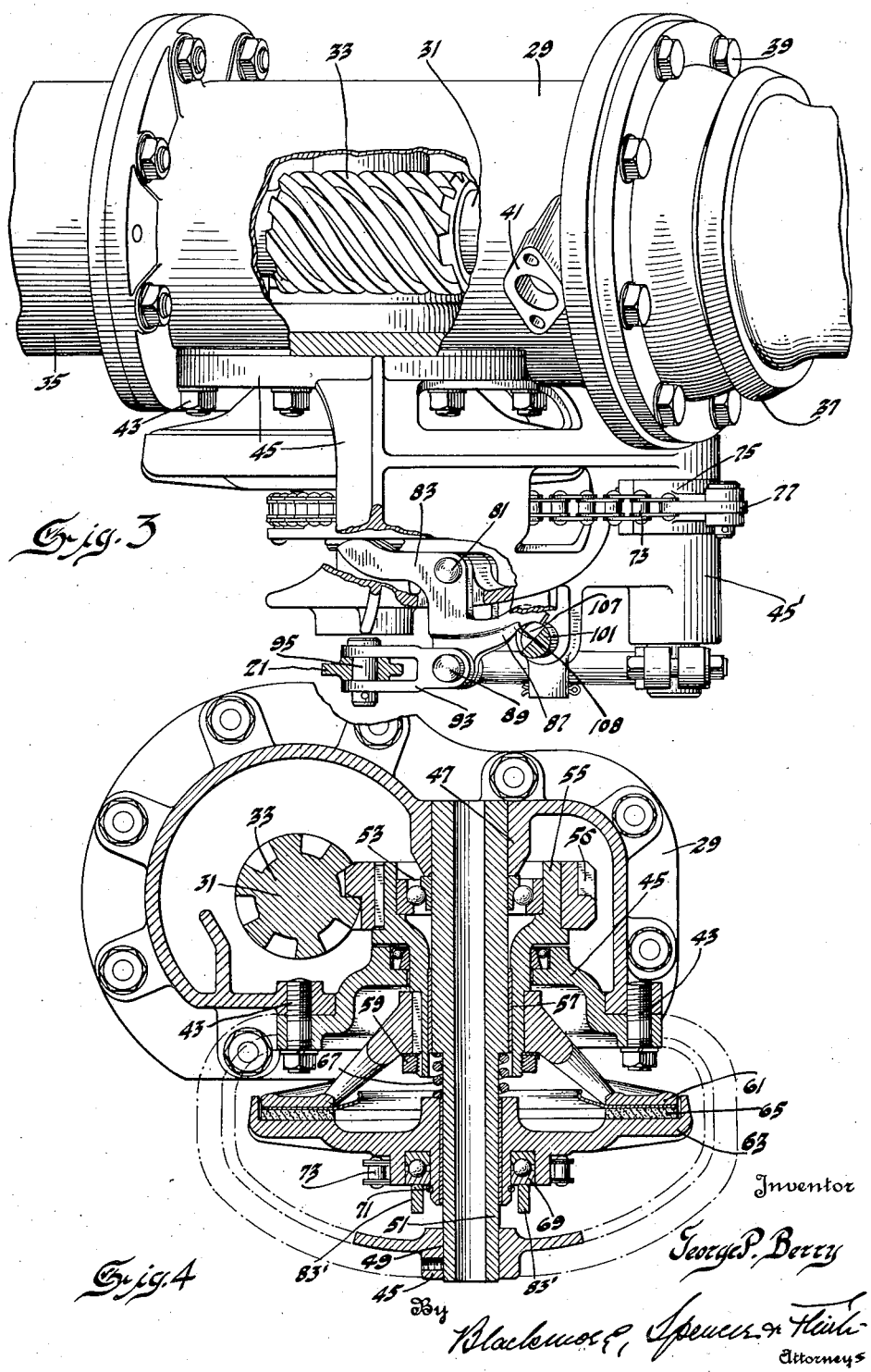

Patented July 5, 1932

1,865,816

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

FRICTION SERVO BRAKE

Application filed August 21, 1930. Serial No. 476,753.

This invention relates to brakes and particularly to brakes for use on vehicles.

A principal object of the invention is to utilize the rotary motion of a shaft, preferably the transmission shaft, to apply the brakes. This is the shaft which drives or is driven by the rear wheels.

A further object is to so relate the power braking mechanism to the manually operated member by which the brake is controlled that there shall be a reaction on the manually operated member in proportion to the intensity of brake application.

Another object is to so relate the parts structurally that there shall be no tendency for the pedal or other manually operated member to move away from the foot or hand of the operator under the influence of the servo motor.

Another object is to so arrange the parts that the variations in the effort exerted by the power device shall be accompanied by but slight changes in the force by which the power device applies the brakes.

Another object is to provide mechanism for rendering the servo brake mechanism inoperative, the manual effort to then operate solely through mechanical linkage.

Other objects and advantages will be understood from the following description.

In the drawings—

Fig. 1 is a view in side elevation of a portion of the vehicle chassis with my invention applied.

Fig. 2 is a side elevation of the mechanism constituting the novel operating device.

Fig. 3 is a view partly in section on line 3—3 of Fig. 2.

Fig. 4 is a section on line 4—4 of Fig. 2.

Fig. 5 is a section on line 5—5 of Fig. 2.

Fig. 6 is a detail in perspective.

Fig. 7 is a perspective of the operating mechanism.

Fig. 8 is a diagrammatic view.

Referring by reference characters to the drawings, numeral 9 is applied to one of the chassis frame bars. At 11 are the brake drums which are to be carried by the wheels as usual. The brakes within the drums may be of any preferred form, but are preferably internal and are operated by lever arms 13. A suitable rock shaft 15 has terminal arms connected by rods 17 to the lever arms 13. Rotation of shaft 15 to apply the brakes is effected by rod 19 and the latter is connected at 20 to the upper end of a floating lever 21. A pedal 23 is connected at a point near its fulcrum by rod 25 with lever 21 at an intermediate point 27 of the latter.

At 29 is a housing for a transmission shaft 31. This transmission shaft is formed or provided with a gear member 33. This housing 29 is shown as secured between the transmission housing 35 and the universal joint housing 37 by means of fastening means 39. At 41 is shown an opening in housing 29 for the passage of the usual speedometer drive shaft.

Secured to the housing 29 by fastening means 43, is a communicating housing 45. The latter projects to one side of housing 29 as shown in Figs. 3 and 4. Supported at 47 within housing 29 and at 49 in housing 45 is a journaled member 51. Within housing 29 bearing 53 rotatably supports a ring 55 carrying a gear member 56 in mesh with gear 33. The ring 55 outwardly from its bearing 53 extends into housing 45, there being a bushing 57 between the ring 55 and the journal. Secured to the end of ring 55, preferably by a splined connection and a retaining member 59, is an annular driving clutch member 61. By the arrangement described the member 61, the driving clutch member, is rotated whenever shaft 31 rotates, either by the motor as it drives the rear wheels or under the influence of the rotating wheels with which it is still in constant driving connection when the clutch is disconnected or transmission in neutral.

Slidable on journal 51 and within housing 45 is a driven clutch member 63, a suitable ring of friction material 65 being used between the driving and driven clutch members. The driven member 63 is normally held in its outermost position and away from contact with driving member 61 by a coil spring 67 encircling journal 51, seated against a shoulder on said journal member and engaging the hub portion of the driven clutch member. For a purpose to be described, the clutch member 63 has an annular recess on its outer side within which is positioned an anti-friction ball bearing 69. The bearing may be retained in position by a spring ring 71. Radially outward of the bearing recess the clutch member carries secured thereto the bight portion of a flexible member such as a chain 73, the ends of the chain extending in converging relation rearwardly.

Pivoted to an extension 45′ of housing 45 is a lever 75 having an upper arm to which are connected the converging ends of the chain 73 by a suitable connecting member 77. The lower arm of lever 75 is connected by a rod 79 with the lower end of floating lever 21 as at 78. Pivoted to the housing 45 at 81 is a lever 83. This lever is of the shape shown by Fig. 6. It has two spaced arms 83′ which are parallel and of angular form. At the angle are registering openings 85 to receive the pivot pin 81. The ends of arms 83′ engage the bearing ring 69 within the recess of the driven clutch plate.

Beyond the two arm portions 83′ the lever is formed as a single arm 87. A pin 89 extends through an opening 91 in the lever and a double yoke 93 is pivoted on the pin 89. Another pin 95 at right angles to pin 89 connects the double yoke to the lever 21, at a point adjacent the point of connection 27 of rod 25 with the lever. From Figs. 2 and 3 it will be seen that suitable openings are made in the housing 45 for the chain 73 and for the lever 83.

There is preferably provided a rod 101 having a handle 103. This rod may be journaled for rotation as at 105 in the car body and at 107′ in the housing 45. Adjacent the lever 83 a portion of the rod is cut-away, the cut-away portion being represented by numeral 107, and the lever has its end curved as at 108 to at times engage the rod 101. This expedient is to render the servo mechanism inoperative when the brake is to be operated solely by the manually applied force acting through mechanical linkage.

As shown in Fig. 5 a spring-actuated detent 110 is used to seat in one or the other of two recesses 112. By this means the rod is held resiliently in either one of the two positions of adjustment.

The operation of the novel mechanism will now be explained. The lower end of lever 21 is connected by the rod 79, the lever 75 and the chain 73 to the clutch member 63, as shown in Fig. 2. When, then, the pedal is depressed the lever 21 will first pivot about its upper end at 20, forcing the frictional clutch members together. When the clutch 63 engages the driving clutch member and in a measure partakes of the rotary motion of the latter, lever 75 is rotated in a counter-clockwise direction whichever may be the direction of rotation of the clutch members 61 and 63. This counter-clockwise rotation of lever 75 operates through rod 79 to produce a similar rotation in lever 21. This results in a tension upon rod 19 and an application of the brakes. The lever 21 will be understood to be rotating about its pivot 27. Such turning of lever 21 about its pivot 27 obviously moves point 95 to the right and modifies the intensity of the frictional contact between the two clutch members until the several forces acting on lever 21 are in balance. Progressive action of the brake requires additional pressure on the pedal to further modify the engagement of the clutch members. The clutch members thereby rotate lever 21 about pivot 27 and further apply the brake until a new balanced condition of the forces acting on lever 21 is established. If the pedal is held with a given manually applied force, a braking force is being applied which is a definite function of the manually applied force, the reaction of the braking force being impressed on the pedal through the tension in rod 25 to give the well known "feel" as a measure of the intensity of brake application.

The operation may be further explained by reference to Fig. 8. In that Figure P is used to represent the pressure exerted by the pedal. A is the tension in brake rod 19. B is the tension in rod 25. C and D the tensions in rods 93 and 79. For simplicity and convenience it may be assumed that the servo motor constituted by the friction disc is of such proportion that the output torque D is equal to the force C applied in putting the servo motor into operation. In other words, if the tension at C is 100 lbs. the servo motor operates with the force of 100 lbs. on the floating lever at $d$.

The pivot $c$ is practically stationary, except for the slight movement necessary to force the friction discs together. When acting as an unassisted mechanical brake, pivot $c$ serves as a center, the lever arm, $a$, $c$ being the work arm of the lever.

The following discussion is given with an assumption that the brake is applied and that the forces and moments must be in balanced relation.

To produce that balance it will first be seen that the force acting through rod 25 must be equal to the sum of the forces acting through 79, 93 and 19, otherwise there would be a movement of translation of the floating link 21. This condition may be expressed as follows:

1. $A + C + D = B$

For convenience it may be assumed that the pedal is being operated with the mechanical advantage of 12. In other words—

2. $B = 12P$

Secondly, the moments about point 27 of the several forces acting on the lever must be equal. The diaphragm shows in inches the lengths of the several arms in a typical case. The equality of moments is expressed in the following equation:

3. $3.25A = 1.25C + 6.5D$

In all cases the force D is a function of force C and in the present instance we are assuming that the force D equals the force C.

4. $C = D$

Substituting for D its equal in equations 1 and 2:

5. $A + 2C = 12P$

With the substitution of C for D equation 3 becomes:

6. $3.25A = 1.25C + 6.5C$

Solving this equation for C:

7. $C = .42A$

Substituting for C this value in equation 5:

8. $A + .84A = 12P$
$A = 6.52P$

With direct mechanical operation of the pedal without assistance from the servo motor:

9. $A = P \times 15/4.5$
$A = 3.34P$

To express the result in a specific example we may assume a pedal pressure of 50 lbs. With this pressure the unassisted mechanical operation is expressed as follows:

10. $A = 3.34 \times 50 = 167$ lbs.

With the aid of the servo motor:

11. $A = 6.52 \times 50 = 326$ lbs.

The force D is as stated a function of the force C. The force C may vary appreciably without materially affecting the force A because of the small lever arm which C has as shown by the diagram. A compensating characteristic therefore exists in this design tending to give a substantially constant force through operating rod 19 even though there be considerable variation in the output of the servo motor, such as may be caused by changes in the coefficient of friction of the lining between the friction discs, and the varying speed of discs. It may be shown that an increase of the servo motor output of 25% will be accompanied by an increase of only about 6% in force A. If instead of D being equal to C it be greater than C as where two discs are used instead of one, the percentage increase in A for changes in D may be shown to be less than 6%. An important characteristic of the device, therefore, is the maintenance of a substantially constant brake applying force A produced by the action of the servo motor.

Another feature is to be found in the application of the several forces to the floating lever. Applied as they are, they act in a direction opposed to pedal travel, and there is therefore no resulting tendency on the part of the pedal to be carried away from the foot of the operator under the influence of the servo device. Upon slippery pavements and in wet weather it may be desirable to render the servo brake mechanism inoperative and to apply the brakes by a direct mechanical connection with the pedal. To effect this arrangement it is only necessary to turn the handle 103 through 180° so that the solid part of rod 101 seats in the recess 108 of lever 83. With the parts in this position the lever 83 cannot be rotated to effect the engagement of the friction clutch elements and pivot 95 becomes a fulcrum about which the manually applied force rotates lever 21 and pulls rod 19 to apply the brake.

I claim:

1. In a servo brake for vehicles, a manually operable member, a lever, means connecting said manually operable member to an intermediate point of said lever, means connected to said lever on one side of said intermediate point for actuating brakes, a frictionally energized servo motor, means connecting said servo motor to said lever on a second side of said intermediate point, and actuating means connecting said servo motor to said lever at a point adjacent said intermediate point.

2. In a servo brake for vehicles, a pedal, a lever, a servo motor, means connected to one end of said lever for applying the brake, means connected to the other end of said lever and said servo motor, means connecting said pedal to an intermediate point of said lever, actuating means to render said servo motor operable, and means connecting said actuating means to a second intermediate point on said lever.

3. The invention defined by claim 2, together with mechanism movable to a position to render said actuating mechanism immovable with the servo mechanism in inactive position.

4. In combination with a motor vehicle having a rotatable shaft to rotate or to be rotated by the rear wheels, a second shaft in geared engagement therewith, a friction disc carried by said second shaft, a second coaxial disc, means to move said second disc into frictional contact with the first disc, a rotatable lever, means connecting the second disc to an arm of said lever whereby the lever is uni-directionally rotated with either direction of rotation of said second disc, a second lever, means connecting a second arm of said first lever with a first arm of said second lever, means connected to a second arm of said second lever for applying brakes upon a rotation of said second lever, means connecting said second lever at an intermediate point with the means to move the second disc, a manually operable member and means connecting said manually operable member with a second intermediate point on said second lever.

5. The invention defined by claim 4, together with a rotatable rod, said rod positioned to engage the means to move the second disc and to hold the two discs disengaged, said rod having a portion cut away on one side thereof to accommodate the movement of said last mentioned means in a second position of adjustment of said rod.

6. In a vehicle having a power transmission shaft, a housing therefor, and brakes, a removable unitary assembly comprising a second housing, a second shaft journalled in said second housing and in geared relation to said transmission shaft when said housings are secured together, a driving clutch member rotatable with said second shaft, a driven clutch member, means movably mounted in said second housing to effect engagement of said clutch members, lever means pivoted in said second housing, connecting means between said lever means and said driven clutch member, whereby said lever means is unidirectionally rotated by any rotation of the clutch members together with a main lever, brake applying means secured to said lever, said lever means and said movably mounted means also secured to said lever and manually operable means also attached to said lever, said last mentioned attachment serving as the fulcrum for the rotation of the main lever by the lever means.

7. In a vehicle having a power transmission shaft, a housing therefor, and brakes, a removable unitary assembly comprising a second housing, a second shaft journalled in said second housing and in geared relation to said transmission shaft when said housings are secured together, a driving clutch member rotatable with said second shaft, a driven clutch member, means movably mounted in said second housing to effect engagement of said clutch members, lever means pivoted in said second housing, connecting means between said lever means and said driven clutch member whereby said lever means is unidirectionally rotated by any rotation of the clutch members, said movably mounted means being a pivoted two arm lever, one arm engaging said driven clutch member the other arm positioned outside said second housing for operation by manually operable means.

8. In a vehicle having brakes and a driven shaft rotatably mounted in a housing, a servo mechanism having as parts thereof a journalled shaft, driving and driven clutch members associated therewith, movable means to effect clutch engagement and lever means rotated by said clutch members, a second housing carrying all said parts and securing means to removably attach said second housing with said parts to said shaft housing, together with a floating lever, manually operable means to engage said floating lever at an intermediate point, said movable means being attached to said floating lever adjacent said intermediate point, means connecting said floating lever adjacent one end to said lever means and a brake applying means secured to the opposite end of the main lever.

In testimony whereof I affix my signature.
GEORGE P. BERRY.